United States Patent [19]

Hansen et al.

[11] 4,313,295
[45] Feb. 2, 1982

[54] BLADE HOUSING MOUNT FOR RIDING MOWERS

[75] Inventors: Loren F. Hansen; Ronald M. Stolley, both of Lincoln, Nebr.

[73] Assignee: Outboard Marine Corporation, Waukegan, Ill.

[21] Appl. No.: 120,258

[22] Filed: Feb. 11, 1980

[51] Int. Cl.³ .............................. A01D 35/26
[52] U.S. Cl. ...................... 56/15.8; 56/15.9; 56/DIG. 22
[58] Field of Search .............. 56/DIG. 10, DIG. 22, 56/15.7, 15.8, 17.1, 17.2, 15.9

[56] References Cited

U.S. PATENT DOCUMENTS

| | | | |
|---|---|---|---|
| 1,651,579 | 12/1927 | Bolens | 56/15.8 |
| 2,154,564 | 4/1939 | Eisenlohr | 56/16.9 |
| 2,764,864 | 10/1956 | Kinkead | 56/DIG. 10 |
| 2,945,338 | 7/1960 | Burrows et al. | 56/17.2 |
| 2,972,850 | 2/1961 | Ariens et al. | 56/15.6 |
| 3,053,033 | 9/1962 | Maguire | 56/DIG. 22 |
| 3,077,065 | 2/1963 | Samways et al. | 56/15.8 |
| 3,136,106 | 6/1964 | Joslin | 56/DIG. 22 |
| 3,166,880 | 1/1965 | Robinson | 56/DIG. 10 |
| 3,680,880 | 8/1972 | Blaaun | 56/DIG. 22 |
| 3,748,839 | 7/1973 | Avis | 56/15.8 |
| 3,897,832 | 8/1975 | Leedahl et al. | 56/6 |
| 4,206,584 | 6/1980 | Johnson | 56/15.8 |

Primary Examiner—Paul J. Hirsch

Attorney, Agent, or Firm—Michael, Best & Friedrich

[57] ABSTRACT

The riding lawn mower includes a prime mover supported on wheels for movement over the ground, a blade housing carrying one or more cutter blades and having leading and trailing end portions, one or more ground engaging wheels partially supporting the blade housing for gaging the distance the leading end portion of the blade housing travels above the ground, and a suspension system mounting the trailing end portion of the blade housing on the front end of the prime mover and arranged to transfer a portion of the weight of the blade housing to the prime mover so that the prime mover front wheels gage the distance and trailing end portion of the blade housing travels above the ground. The suspension system includes one or more longitudinally extending push arms, a mount pivotally mounting one end of each push arm on the prime mover for pivotal movement of the push arm relative to the prime mover about a first generally horizontal axis, and a mount pivotally mounting the other end of each push arm on the trailing end portion of the blade housing for permitting upward pivotal movement of the trailing end portion of the blade housing relative to the push arm about a second generally horizontal axis and for limiting downward pivotal movement of the trailing end portion relative to the push arm about the second axis and thereby controlling the minimum distance the trailing end portion travels above the ground.

10 Claims, 4 Drawing Figures

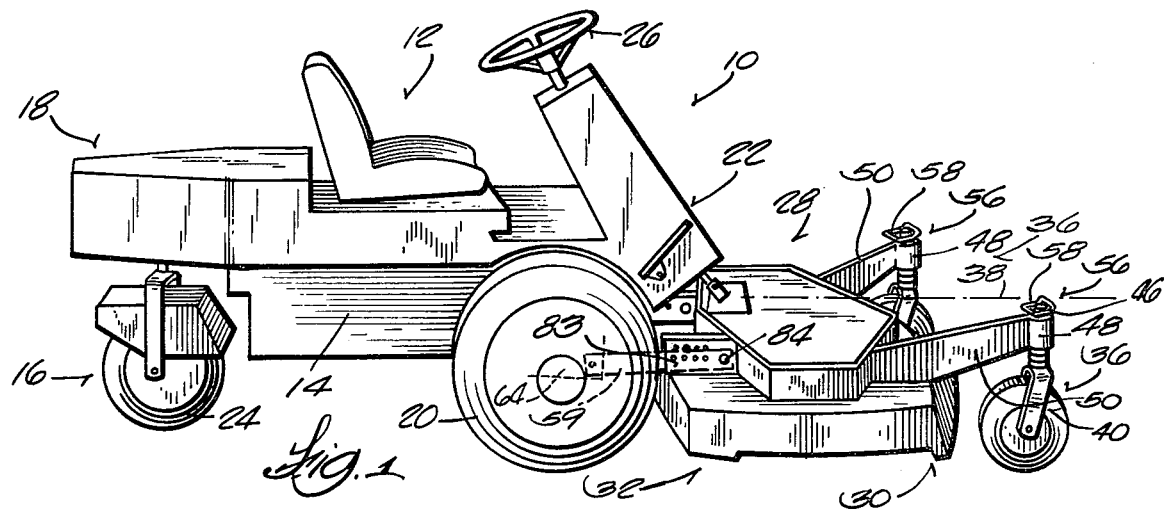
Fig. 1
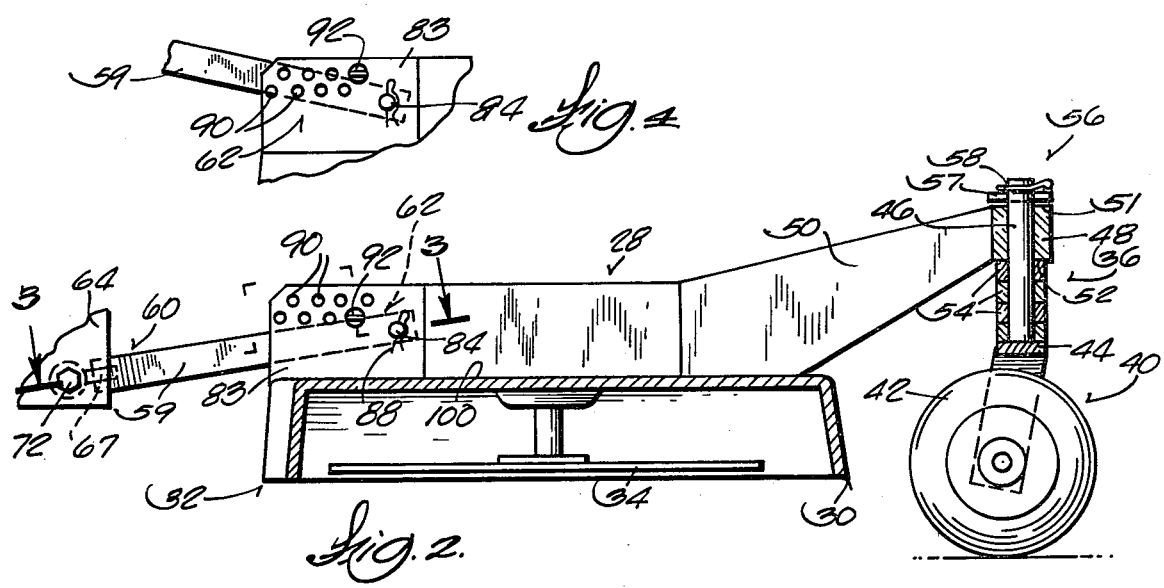
Fig. 4
Fig. 2
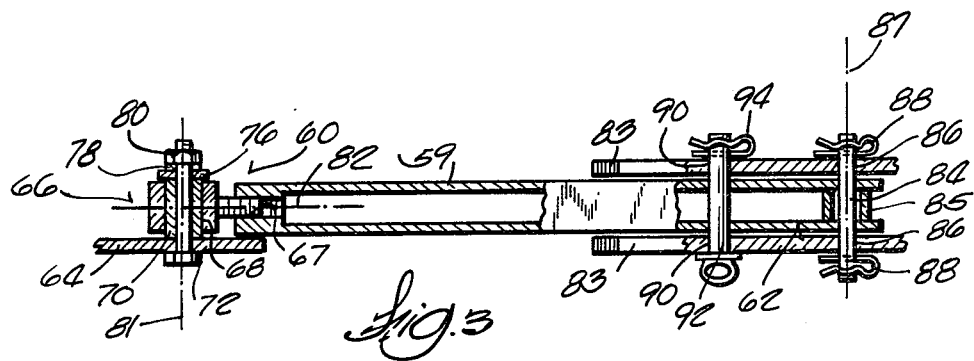
Fig. 3

BLADE HOUSING MOUNT FOR RIDING MOWERS

FIELD OF THE INVENTION

This invention relates to riding mowers and, more particularly, to riding mowers including a cutter blade housing suspended from a prime mover in a manner to follow uneven ground contours.

BACKGROUND PRIOR ART

Riding rotary mowers usually include a cutter blade housing pivotally suspended from a prime mover. In order to provide an even cut and prevent scalping of high spots, the suspension system should permit the blade housing to follow uneven ground contours being traversed by the mower. Also, the capability of adjusting the cutting height without the use of tools is highly desirable, as well as the capability of being able to quickly disconnect the blade housing from the prime mover to permit the installation of other implements.

The U.S. Samways et al U.S. Pat. No. 3,077,065, issued Feb. 12, 1963, discloses an exemplary prior art construction of suspension mounts for rotary mowers. The U.S. Leedahl et al Pat. No. 3,897,832, issued Aug. 5, 1975, discloses an exemplary prior art suspension mount for agricultural tools arranged to permit a part to follow the contour of the ground. The U.S. Eisenlohr Pat. No. 2,154,564, issued Apr. 18, 1939, and the U.S. Maguire Pat. No. 3,053,033, issued Sept. 11, 1962, discloses arrangements for adjusting the cutting height of a rotary cutter blade.

SUMMARY OF THE INVENTION

The invention provides a riding mower including a prime mover having a chassis supported on a wheel for movement over the ground, a blade housing carrying a cutting blade and having first and second end portions, a ground engaging wheel mounted on the first end portion of the blade housing for partially supporting the blade housing and for permitting the prime mover wheel to gage the distance the first end portion of the blade housing travels above the ground, and means suspending the second end portion for transferring a portion of the weight of the blade housing to the prime mover and for gaging the distance above the ground at which the second end portion of the blade housing travels.

The suspending means can include one or more push arms having first and second ends, means mounting the first end of each push arm on the prime mover chassis for pivotal movement of the push arm relative to the prime mover about a first generally horizontal axis, and means mounting the second end of each push arm on the blade housing relative to the push arm about a second generally horizontal axis and for selectively preventing downward movement of the second end of the blade housing relative to the push arm about the second horizontal axis and thereby controlling the minimum distance the second end portion of the blade housing travels above the ground.

In one embodiment, means are provided on the blade housing for releasably engaging the push arm to prevent downward pivotal movement of the second end portion of the blade housing relative to the push arm.

In another embodiment, means are provided for selectively varying the point of engagement between the engaging means and the push arm to adjust the minimum distance of the second end portion of the blade housing above the ground.

In a further embodiment, means are provided for mounting the first end of each push arm on the prime mover chassis so as to permit the push arm to rotate about its longitudinal axis relative to the prime mover chassis so that the blade housing can tilt from side to side relative to the prime mover.

One of the principal features of the invention in the provision of a riding mower including a prime mover and a simple suspension system mounting a cutter blade housing on the prime mover to transfer a portion of the weight of the blade housing to the prime mover so that the prime mover wheels gage the distance at which one portion of the blade housing travels.

Another of the principal features of the invention is the provision of such a riding mower wherein the suspension system is arranged to permit the blade housing to follow uneven ground contours and provide a uniform cutting height.

A further of the principal features of the invention is the provision of a riding lawn mower including means for conveniently adjusting the cutting height of the blade housing without the use of tools.

Other features and aspects of the invention will become apparent to those skilled in the art upon reviewing the following general description, the drawing and the appended claims.

BRIEF DESCRIPTION OF THE DRAWINGS

FIG. 1 is a perspective view of a riding rotary lawn mower incorporating various of the features of the invention.

FIG. 2 is an enlarged, partially sectioned, view of the cutter blade housing and the suspension system of the mower shown in FIG. 1, with the cutter blade housing set at the maximum cutting height.

FIG. 3 is an enlarged sectional view taken generally along line 3—3 in FIG. 2.

FIG. 4 is a fragmentary view portion of the blade housing and a push arm with the blade housing set at the minimum cutting height.

Before explaining one embodiment of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology and terminology employed herein is for the purpose of description and not of limitation.

GENERAL DESCRIPTION

Illustrated in the drawings is a riding rotary mower 10 including a vehicle or prime mover 12 having a chassis 14 supported for travel over the ground by a steering unit 16 mounted on the rear end portion 18 of the chassis 14 and a pair of laterally spaced front wheels 20 (one shown) rotatably mounted on the front end portion 22 of the chassis 14. The steering unit 16 includes one or more rear wheels 24 (one shown) which partially support the chassis 14. A power source (not shown), such as an electric motor, a hydraulic motor or an internal combustion engine, is drivingly connected either to the rear wheels 24 or the front wheels 20 through a suitable drive train (not shown). Steering movement of the steering unit 16 is accomplished by a steering wheel 26 operably connected to the steering unit 16 in a suitable manner.

Located forwardly of the front wheel 20 is a cutter blade housing 28 having a first or leading end portion 30 and a second or trailing end portion 32 with respect to the direction of travel. Disposed inside the cutter blade housing 28 is a plurality of rotary cutter blades 34 (one shown in FIG. 2), each of which is mounted for rotation about a generally vertical axis and is driven by the prime mover power source through a suitable power take-off and drive train (which is not shown).

The leading end portion 30 of the blade housing 28 is supported for travel along the ground by a pair of caster wheel assemblies 36 located at the opposite sides of the longitudinal center line 38 of the blade housing 28 extending generally parallel to the direction of travel. Each caster wheel assembly 36 (FIG. 2) includes a swivel bracket 40 rotatably supporting a wheel 42. The swivel bracket 40 has a shoulder 44 and a vertical shaft 46 mounted for pivotal movement about a generally vertical axis in a cylindrical sleeve 48 on the outer end of a support arm 50 extending forwardly from the leading end portion 30 of the blade housing 28. The sleeve 48 has upper and lower surfaces 51 and 52.

Means are provided for selectively adjusting the vertical height of the sleeve relative to the rotational axis of the wheel 42 and thereby adjusting the distance at which the leading end portion 30 of the blade housing 28 travels above ground. While various arrangements can be used, in specific construction illustrated, such means includes a plurality of spacers 54 which slide onto the swivel bracket shaft 46 between the sleeve lower surface 52 and the swivel bracket shoulder 44 (as illustrated in FIG. 2) and/or between the sleeve upper surface 51 and a retainer 56 removably received in an aperture in the upper end of the swivel bracket shaft 46. In the specific construction illustrated, the retainer 56 comprises a pin 57 including a pivotal bail 58 which snaps over the upper end of the swivel bracket shaft 46.

The cutting height of the leading end portion 30 of the blade housing 28 can be adjusted by changing the number of spacers 54 located above and below the sleeve 48. The maximum cutting height exists when all the spacers 54 are located below the sleeve 48 as illustrated in FIG. 2 and the minimum cutting height exists when all the spacers 54 are located above the sleeve 48. This adjustment can be made without tools by simply unsnapping the retainer pin bail 58 and pulling on it to remove the retainer pin 57, sliding the swivel bracket shaft 46 out of the sleeve 48, placing the appropriate number of spacers 54 on the swivel bracket shaft 46, sliding the swivel bracket shaft 46 back into the sleeve 48, placing the remaining spacers 54 on the swivel bracket shaft 46 about the sleeve 48, and replacing the retainer pin 57.

Means are provided for suspending the trailing end portion 32 of the blade housing 28 from the front end portion 22 of the prime mover chassis 14 for transferring a portion of the weight of the blade housing 28 to the front wheels 20 of the prime mover and for adjustably gaging the minimum distance above the ground at which the trailing end portion 32 of the blade housing 28 travels. While various arrangements can be used, in specific construction illustrated, such means includes a pair of longitudinally extending push arms 59 (one shown) disposed at the opposite sides of the longitudinal centerline 38 of the blade housing 28. The inner end 60 of each push arm 59 is mounted on the front end portion 22 of the prime mover chassis 14, at a point in close proximity to a front wheel 20, for pivotal movement of the push arm 59 relative to the prime mover 12 about a first generally horizontal axis. The outer end portion 62 of each push arm 59 is mounted on the trailing end portion 32 of the blade housing 28 for relative pivotal movement about a second generally horizontal axis.

More specifically, a mounting plate 64 (shown fragmentarily in FIGS. 1 and 2) is provided on the prime mover chassis 14 in close proximity to each front wheel 20. Mounted on each push arm 59 (FIG. 3) is a pivot member 66 including a threaded section 67 loosely threaded into the inner end 60 of the push arm 59 and an aperture 68 receiving a bushing 70. Each pivot member 66 is mounted on a mounting plate 64 by a bolt 72 extending through an aperture in the mounting plate 64 and through the bushing 70. The bushing 70 is locked in place by a captivating washer 76 bearing against one side of the bushing 70, a lock washer 78, and a nut 80 threaded onto the bolt 72. Each pivot member 66, and thus each push arm 59, is free to pivot relative to the prime mover 12 in a generally vertical plane about a first generally horizontal axis 81 provided by the bolt 72.

The threaded section 67 extends generally perpendicular to the axis 81. The threaded connection between the push arms 59 and the pivot member 66 permits each push arm 59 to rotate in either direction about a longitudinal axis 82 provided by the threaded section 67 of the pivot member 66.

The outer ends 62 of the push arms 59 are mounted on the trailing end portion 32 of the blade housing 28 in a manner to permit upward pivotal movement of the blade housing 28 relative to the push arms 59 and to limit downward pivotal movement of the blade housing 28 relative to the push arms 59. While various arrangements can be used, in the specific construction illustrated, each push arm 59 extends between and is pivotally mounted on a pair of upstanding plates 83 on the trailing end portion 32 of the blade housing 28. Each pair of the plates 83 is located at the opposite sides of and equally spaced from the longitudinal center line 38 of the prime mover 12. The plates 83 are spaced from each other to permit free pivotal movement of the respective push arm 59 and yet prevent substantial relative lateral movement so as to keep the blade housing 28 in a lateral alignment with the prime mover 12.

The pivotal mount between each push arm 59 and the blade housing 28 includes a quick disconnect pin 84 extending through a bearing 85 on the outer end 62 of the push arm 59 and through coaxial apertures 86 in the plates 83. Each push arm 59 and the blade housing 28 can pivot relative to each other in a generally vertical plane about a second generally horizontal axis 87 provided by the respective pin 84. The opposite ends of each pin 84 extend outwardly beyond the plates 83. Each pin 84 is held in place by an easy-to-remove retaining means, such as a hair pin clip 88 releasably mounted on each end, which can be conveniently and quickly removed by hand without tools to facilitate interchanging other implements.

Disposed above each push arm 59 and extending through coaxial apertures 90 in the plates 38 is a quick disconnect pin 92 which engages the upper surface of the push arm 59 to limit downward pivotal movement of the trailing end portion 32 of the blade housing 28 relative to the push arm 59. Each of the pins 92 is held in place by an easy-to-remove retaining means, such as a hair pin clip 94. A portion of the weight of the blade housing 28 is transferred to the prime mover 12 via the pins 92 and the push arms 59.

The blade housing 28 can be moved between the lowered mowing position illustrated in FIGS. 1 and 2 and a raised non-mowing position about the pivot axes 81 by suitable lift means (not shown) mounted on the front of the prime mover 12 and operably connected to the blade housing 28.

The pins 92 control the minimum distance between the trailing end portion 32 of the blade housing 28 and the ground. One or more rows of the apertures 90 are provided in the plates 83 and are geometrically located relative to the pivot axis 87 to permit different degrees of pivotal movement of the trailing end portion 32 of the blade housing 28 relative to the push arms 59 and thereby provide predetermined adjustments in the cutting height. Thus, the desired cutting height of the trailing end portion 32 of the blade housing 28 can be effected by placing the pin 92 in the appropriate aperture 90. Location of the pins 92 for maximum and minimum cutting heights are illustrated in FIGS. 2 and 4, respectively. The cutting height of the blade housing 28 can be conveniently adjusted without the use of tools by simply removing the hair pin clips 94 by hand and placing the pins 92 in the appropriate apertures 90 and removing the retainer pin 57 by hand from the caster wheel assemblies 36 and placing the appropriate number of spacers 54 above and below the sleeve 48 as described above.

When the blade housing 28 is in the mowing position illustrated in FIG. 21, the pins 92 limit downward pivotal movement, but not upward pivotal movement, of the trailing end portion 32 of the blade housing 28. The push arms 59 are located relative to the top surface 100 of the blade housing 28 to limit upward pivotal movement of the trailing end portion 32 of the blade housing 28. That is, the upward pivotal movement of the blade housing 28 is limited by the surface 100 engaging the bottom edges of the push arms 59.

With this arrangement, the pins 92 prevent the trailing end portion 32 of the blade housing 28 from dipping below a minimum height when the front wheels 42 encounter a hill or swell. On the other hand, when the front wheels 42 roll down a hill or into a depression, the trailing end portion 32 of the blade housing 28 is free to pivot upwardly relative to the push arms 59 about the pins 84, thereby preventing scalping by the cutter blades 34 or possible gouging by the blade housing 28. In the event laterally uneven contour is being traversed by the blade housing 28, the push arms 59 can rotate relative to the pivot member 56 via the threaded connection therebetween, allowing the blade housing 28 to tilt sideways relative to the prime mover so it can follow or float with the ground contour and provide a uniform cut.

Various of the features of the invention are set forth in the following claims:

We claim:

1. A riding mower comprising a prime mover having a chassis supported on a rotatable wheel for movement over the ground, a blade housing carrying a cutter blade and having first and second end portions, a ground engaging wheel mounted on said first end portion of said blade housing for partially supporting said blade housing and for gaging the distance above the ground at which said first end portion of said blade housing travels, a push arm having first and second ends, means mounting said first end of said push arm on said prime mover chassis for pivotal movement of said push arm relative to said prime mover chassis about a first generally horizontal axis, and means mounting said second end of said push arm on said blade housing for permitting upward pivotal movement of said second end portion of said blade housing relative to said push arm about a second axis and selectively preventing downward pivotal movement of said second end portion of said blade housing relative to said push arm and thereby transferring a portion of the weight of said blade housing to said prime mover chassis and controlling the minimum distance above the ground at which said second end portion of said blade housing travels.

2. A riding mower according to claim 1 wherein said means mounting the second end of said arm on said blade housing includes means on said blade housing for releasably engaging said push arm to prevent downward pivotal movement of said second end portion of said blade housing relative to said push arm.

3. A riding mower according to claim 2 including means on said blade housing for selectively varying the point of engagement between said engaging means and said push arm to adjust the minimum distance above the ground of said second end portion of said blade housing.

4. A riding lawn mower according to claim 3 including an upstanding plate on said blade housing and wherein said push arm has an upper surface and said second end thereof is mounted on said plate for pivotal movement of said push arm about said second horizontal axis, wherein said engaging means comprises a pin for engaging said push arm upper surface to prevent downward pivotal movement of said second end portion of blade housing relative to said push arm, and wherein said means for selectively varying the point of engagement comprises a plurality of apertures in said plate for removably receiving said pin and located relative to said second horizontal axis to permit different degrees of downward pivotal movement of said second end portion of said blade housing relative to said push arm.

5. A riding mower according to claim 1 wherein said means mounting said push arm first end to said prime mover chassis includes means for permitting said push arm to rotate about its longitudinal axis relative to said prime mover chassis.

6. A riding mower according to claim 1 wherein said means mounting said push arm first end on said prime mover chassis comprises a pivot member mounted on said prime mover chassis for pivotal movement about said first horizontal axis and including a threaded section which extends generally perpendicularly to said first horizontal axis and is loosely threaded into said push arm first end to permit said push arm to rotate relative to said threaded section.

7. A riding mower comprising a prime mover having a chassis including a front end portion supported on a pair of laterally spaced wheels for movement over the ground, a housing carrying a cutter blade having leading and trailing end portions with respect to the direction of travel, and having a longitudinal axis extending generally parallel to the direction of travel, a pair of ground engaging wheels mounted on said blade housing at the opposite sides of the longitudinal axis thereof for partially supporting said blade housing and gaging the distance above the ground at which said leading end portion of said blade housing travels, and means suspending said blade housing trailing end portion from said front end portion of said prime mover chassis for transferring a portion of the weight of said blade housing to said prime mover and for permitting said prime mover wheels to gage the distance above the ground at which said trailing end portion travels, said suspending means including a pair of longitudinally extending push arms disposed at the opposite sides of the longitudinal axis of said blade housing and having first and second ends, means respectively mounting said first end of each of said push arms on said front end portion of said prime mover chassis for pivotal movement of said push arms relative to said prime mover about a first generally horizontal axis, and means respectively mounting said second end of each said push arms on said trailing end portion of said blade housing for permitting upward pivotal movement of said trailing end portion relative to said push arm about a second generally horizontal axis and for limiting downward pivotal movement of said trailing end portion relative to said push arm about said second horizontal axis to control the minimum distance above the ground at which said trailing end portion travels.

8. A riding mower according to claim 7 wherein each of said means mounting said push arm second end on said blade housing includes a pair of spaced upstanding plates on said blade housing receiving said push arm therebetween, means mounting said second end of said push arm on said plates for pivotal movement relative thereto about said second horizontal axis, a pin for engaging said push arm to prevent downward pivotal movement of said trailing end portion relative to said push arm and thereby control the minimum distance above the ground at which said trailing end portion travels, and a plurality of coaxial apertures in said plates for removably receiving said pin and located relative to said second horizontal axis to permit different degrees of downward pivotal movement of said trailing end portion relative to said push arm.

9. A riding mower according to claim 7 wherein each of said means mounting said push arm first end on said prime mover chassis includes means for permitting said push arm to rotate about its longitudinal axis relative to said prime mover chassis.

10. A riding mower according to claim 7 wherein each of said means mounting said push arm first end on said prime mover chassis comprises a pivot member mounted on said prime mover chassis for pivotal movement about said first horizontal axis and including a threaded section which extends generally perpendicular to said first horizontal axis and is loosely threaded into said push arm first end to permit said push arm to rotate relative to said threaded section.

* * * * *